CZOCHRALSKI-GROWN SPINEL FOR USE AS EPITAXIAL SILICON SUBSTRATE
Filed March 19, 1971
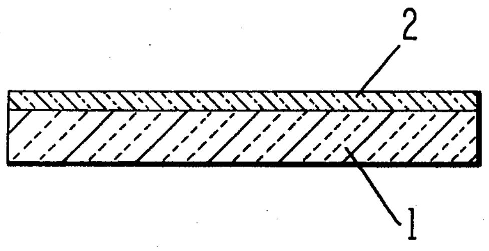
INVENTORS.
Glenn W. Cullen
Stephen R. Bolin,
Andrew D. Morrison, a
Chih C. Wang.
BY
W. S. Hill
AGENT

United States Patent Office 3,736,158
Patented May 29, 1973

3,736,158

CZOCHRALSKI-GROWN SPINEL FOR USE AS EPITAXIAL SILICON SUBSTRATE

Glenn Wherry Cullen, Princeton, and Stephen Ray Bolin, Hightstown, N.J., Andrew David Morrison, Winchester, Mass., and Chih Chun Wang, Hightstown, N.J., assignors to RCA Corporation Filed Mar. 19, 1971, Ser. No. 126,113
Int. Cl. C04b *35/44*
U.S. Cl. 106—42 2 Claims

ABSTRACT OF THE DISCLOSURE

An improved single-crystal magnesium aluminate spinel is grown from alumina-rich melts so that the resulting spinel crystal displays a single lattice constant. This material exhibits superior qualities for use as an epitaxial silicon substrate, especially in view of its chemical stability. A method is given for producing these improved spinel crystals by an adaptation of the Czochralski method such that crystals can be prepared from nonstoichiometric melts.

The invention herein described was made in the course of or under a contract or subcontract thereunder with the Department of the Navy.

BACKGROUND OF THE INVENTION

Field of the invention

This invention relates to an improved Czochralski-grown spinel for use as an epitaxial silicon substrate and its preparation from nonstoichiometric alumina-rich melts.

Description of the prior art

Single crystal magnesium aluminate spinel has been prepared by a number of crystal growth techniques, including the flame-fusion, flux and Czochralski methods. Because of the chemical reactions involved, all crystals grown by the flux method are stoichiometric. To date, those grown by the Czochralski method have also been stoichiometric or nearly so. However, the flame-fusion spinel which has proven to be the most suitable for substrate use is within the alumina-rich molar ratio $$(Al_2O_3:MgO)$$

range of from 1.5 to 2.5 (in the 3.3 and above range, flame-fusion spinel lacks the thermal stability for integrated circuit processing and in the 1.5 to 1.0 range the flame-fusion single crystal spinel becomes increasingly difficult to grow as the stoichiometric point is reached).

Examination of the spinel crystals grown by each of the methods has led to the conclusion that the crystals grown by these techniques have distinctly different physical and electrical properties. The specific properties of thermal stability, chemical reactivity of the surface, crystalline perfection and hole mobility must be taken into consideration when applying spinel to various electronic systems. The most obvious property differences can be associated with composition, and the composition, as indicated above, is to a large extent dictated by the crystal growth method employed. It has also been observed, however, that even crystals of nominally the same composition grown by different methods have distinctly different properties. For example, large differences in electrical properties have been measured in epitaxial silicon on flux and Czochralski grown crystals, the compositions of which are identical within the accuracy of the analytical methods employed.

One of the techniques used to establish the suitability for substrate use of the various spinel crystals is the measurement of defect density. The spinels have been ranked in order of decreasing defect density, which also, incidentally is the order of increasing impurity content, and the said ranking of crystals grown by the three methods is as follows: flame-fusion, Czochralski, flux.

As work progressed in this field, there was increasing interest in the low-alumina-rich flame-fusion spinel for use as a substrate for epitaxially grown silicon. This came about as the silicon grown on flame-fusion substrate had desirable electrical characteristics. This also lead to early, but unsuccessful, attempts to grow nonstoichiometric, large-sized crystals by the Czochralski methods. However, work in this area was only able to produce multiphasic crystals.

Grabmaier and Watson in their article entitled, "Czochralski Grown Crystals of Aluminum-Magnesium Spinel" in the Journal of the American Ceramic Society, volume 1, page 355 (1968), disclosed an earlier attempt to produce Czochralski grown spinels from nonstoichiometric melts (in this instance, with a molar ratio of $MgO:Al_2O_3$ of 1:3.2). However, X-ray analysis of two crystals grown from such melt showed that each had two lattice constant values and as such would not be as desirable for epitaxially grown silicon as the low-alumina-rich flame-fusion spinel. Also in the articles entitled, "A Vertical Pulling of $MgAl_2O_4$ Single Crystals," Journal of Materials Science, volume 2, page 498 (1967); and "The Morphology and Defect Characteristics of Vertical Pulled $MgAl_2O_4$ Single Crystals," from the Journal of Materials Science, volume 4, page 236 (1969). Cockayne et al. disclose further attempts along similar lines. Here the researchers used alumina-rich melts of a molar ratio of 1.02 and noted that void structures were initiated at growth rates approaching 20 mm./hour.

Evaluation of single crystal Czochralski spinel produced from stoichiometric melts revealed that upon the growth of epitaxial silicon by methods used to deposit on flame fusion spinel, surface chemical reactions took place and the reactants were incorporated into the silicon layer. The same researchers also found that silicon applied to low-alumina-rich, flame-fusion spinel introduced in the same silicon growth run did not contain the undesirable surface chemical reaction products.

The single crystal alumina rich spinel has been evaluated for the epitaxial growth of silicon and the results have been published in Cullen et al's. article entitled "Epitaxial Growth and Properties of Silicon on Alumina-Rich Single-Crystal Spinel" in the Journal of the Electrochemical Society, October 1969, volume 116, pages 1444–1449. Other similar studies of silicon on spinel include C. Zaminer's "Zur Entstehung von Kristallbaufehlern in Silizium-Schichten bei epitaxialer Abscheidung auf Mg-Al-Spinell" in Zeitschrift fur Angewandte Physik, volume 24, page 223 (1968).

OBJECTS OF THE INVENTION

An object of the present invention is to provide single-phase, magnesium aluminate (spinel) crystals having suitable chemical and physical properties for use as substrates, including a chemically reaction-free surface for epitaxial growth of silicon or similar semiconductive material and upon growth of said layer, experiencing a distinctive and satisfactory hole mobility.

A further object of the invention is to produce near alumina-rich magnesium aluminate spinel crystals, free from the size limitations experienced in previously used methods of spinel crystal growth such as flux-grown and flame-fusion.

A yet further object of the invention is to provide analytical techniques to distinguish this unusual material from other magnesium-aluminate spinels and also from Czochralski-grown spinels pulled from stoichiometric melts.

DESCRIPTION OF THE DRAWING

The figure is a cross-sectional view of a magnesium aluminate wafer having a layer of epitaxial silicon thereon.

DESCRIPTION OF THE DRAWING EMBODIMENT

Using a conventional high-temperature, Czochralski crystal growth station, magnesium aluminate spinel crystals are pulled from melts of magnesia and alumina combined in the desired ratio, the crystal quality is then checked, and epitaxial silicon is applied to a suitable section of the crystal. The crystal growth station, similar to the one shown in W. A. Tiller's "Principles of Solidification" in Art and Science of Growing Crystals, ed. J. J. Gilman (J. Wiley & Sons, Inc., New York; 1963), is powered by a Lepel 20 kw., 450 kHz. generator. Control for this growth station is accomplished through a closed loop system comprising the generator, a grid-dip meter used as a relative R-F field intensity detector, a set-point, 3-mode controller, and a saturable reactor. Using this control loop, temperature can be maintained at 2200°± 0.3° C. for long periods of time. The furnace is designed such that the coil is sufficiently spaced from the quartz tube so that arcing because of high-temperature ionization of the growth atmosphere is avoided. Typically, a cylindrical iridium crucible, in this case one having dimensions 5.7 cm. tall x 4.5 cm. in diameter—is centered in the coil. The aforementioned quartz tube serves to contain the zirconium dioxide ($ZrO_2$) grog insulation. Also, so as to prevent cracking of the crystal during and immediately after growth, a set of ceramic muffles are placed above the melt and, by so doing, the temperature is maintained at greater than 1600° C. over the entire length of the growing crystal. A pyrex bell jar is used to contain the desired atmosphere and to increase the thermal stability of the system.

The crucible is then loaded with high-density, granular magnesia and alumina in the form of scrap Verneuil sapphire both of which materials having less than 150 p.p.m. total impurities as indicated by emission spectrographic analyses. In the preferred embodiment, the crucible charge has a total weight of 160 gm. with an $Al_2O_3$/MgO molar ratio of 1.05:1; and, on melting, the load fills the crucible to within 9 mm. of the lip.

An oriented seed <111>, <100>, etc. fabricated from previously grown boules (initial boules were spontaneously nucleated from a 1/16" iridium rod) is tied with 10-mil, unannealed iridium wire to an electrically isolating sapphire extension of the puller shaft. Upon obtaining the complete melt at approximately 2105° C., the temperature is adjusted until a bright meniscus is formed around the seed which indicates that a solid-liquid equilibrium isotherm in the melt is the diameter of the seed. Pulling is then commenced at an empirically determined optimum pull rate of 5 mm./hour with rotation rate of from 10 to 15 r.p.m. For best results, the above process was conducted in an atmosphere suppressing the vaporization of magnesia, consisting of nitrogen premixed with 0.2% oxygen. This gaseous mixture, which has also been shown to eliminate rough crystal surfaces attributable to oxygen deficiency, is used to purge the system prior to crystal growth, and, during growth, is used at a rate of approximately 9 c.f.h. Upon reaching the desired length, the pull rate is increased to approximately 18 cm./hr. and the crystal separates from the melt in 5 to 10 minutes.

After separating the single-crystal spinel from the remaining portion of the melt, substrate preparation is undertaken. Such preparation is of critical importance as the surface perfection and growth rate of the epitaxial film are closely related to the substrate orientation and surface perfection of the major surface plane. Another aspect of careful surface preparation is that the silicon-spinel composites formed on surfaces which have been accurately cut, mechanically lapped and polished, and hydrogen annealed under controlled conditions, have reproducible characteristics.

For accurate cutting, it is therefore necessary to determine the exact orientation of the spinel crystals. Crystal orientation discussed herein are in terms of indices of lattice directions, also called Miller indices. These indices are vector components of the lattice direction resolved along each of the coordinate axes and reduced to the smallest integers. As in the spinel material a cubic lattice is experienced, the crystallographic designations are greatly simplified. This is accomplished using the X-ray Laué back-reflection method as described by C. G. Dunn and W. W. Martin [Transactions of the AIME 185, 417 (1945)]. Using this method, a spinel crystal under examination is first mounted on a goniometer and then irradiated by a collimated beam of unfiltered X-rays. This beam is diffracted back in a Laué spot pattern, each spot caused by a definite plane. Another advantage of the cubic lattice of spinel is that once any major plane is found, the other planes can be readily located by standard cubic projections. After the initial Laué work, the crystal is mounted on lava and steel blocks in a roughly oriented position. Final Laué patterns of the mounted crystal are taken to give the accurate relationship of the crystal to the steel block to establish the cutting directions. Laué patterns used for the orientation of single crystal spinel grown from stoichiometric melts are equally applicable to single crystal spinel grown from alumina-rich melts. Spinel wafers about 20 mils thick are then prepared by cutting the X-ray oriented crystal using a standard-type diamond wheel. In this particular application wafers were cut with a {111}-oriented Laué pattern and maintaining an accuracy of better than ½° throughout the cutting operation.

The spinel substrate wafers are then mechanically lapped and polished to produce a flat, smooth surface which is required for silicon epitaxy. In the preferred embodiment, the lapping is carried out with fine boron carbide abrasives so as to obtain a flat coplanar surface. This process is one of several that may be used. The lapped surface is further polished using successively finer grades of alumina, generally ending with the $0.06\mu$ grade. After polishing, the wafers have a flatness of $\pm 0.4\mu$/cm. as revealed by interferometry.

After mechanical polishing, scratches, mounds, absorbed layers, and impurity aggregates are generally found on the substrate surfaces. Such surface damage often needs to be corrected so that defects in the epitaxial film are avoided. Therefore, high temperature etching (1100° to 1400° C.) in hydrogen is optionally used to improve the surface crystallinity. Empirically, the desired hydrogen annealing for single crystal-spinel grown from low alumina-rich melts is conducted at 1200° C. for a 20-minute period. After such annealing, electron diffraction patterns show sharp Kikuchi lines indicating high crystalline perfection of the surfaces.

If hydrogen annealing is insufficient to remove all of the surface work damage caused by mechanical polishing, then chemical smoothing of the surface using various etchants is employed. The etchants include $H_2SO_4$, $H_3PO_4$, KOH, $B_2O_3$, $V_2O_5$, $Na_2B_4O_7$, and $PbF_2$. More complete data on chemical etchants are readily available from "Single Crystal Spinel for an Electronic Application," Technical Report AFML-TR-68-320, Air Force Materials Laboratory, Wright-Patterson Air Force Base, Ohio (October 1968) by C. C. Wang et al. at pages 78-92.

In the production of improved Czochralski-grown spinel from nonstoichiometric melts, a significant characteristic is that the material, unlike flame fusion spinel, is essentially grain-boundary free. The extent of absence of grain boundaries is measured by several techniques of X-ray diffraction topography including the Schulz method described in "Method of Using a Fine-Focus X-Ray Tube for Examining the Surface of Single Crystals," from J. Metals, volume 6, page 1082 (1954) by L. G. Schulz; the Berg-Barrett method described in "An X-Ray Method for Study of Lattice Disturbances of Crystals," from Naturw., volume 19, page 391 (1931) by W. Berg and "New Microscopy and its Potentialities" from Trans. AIME, volume 161, page 15 (1945) by C. S. Barrett; and, by the Lang method described in "Direct Observation of Individual Dislocations by X-Ray Diffraction," from J. Appl. Phys., volume 29, page 597 (1958) and volume 30, page 1748 (1959) by A. R. Lang.

Of these, Schulz method using an unfiltered X-ray beam from a point source has been used to determine that typically, in the Czochralski-grown spinel from nonstoichiometric melts, low angle grain boundaries are of the order of less than 0.5° for both tilt angles and twist angles, and in fact are generally of the order of 0.2°. Using this method, rotations as small as a few seconds of arc are detectable. By contrast to the measurements performed on Czochralski grown spinel from nonstoichiometric melts, the same low angle grain boundary measurements on flame fusion spinel reveals typical tilt and twist angles of approximately 1.0°. Additionally, as tilt and twist angles of less than 0.5° are not obtainable for flame fusion spinel, this physical measurement provides a line of demarcation between the two materials.

Similar to the distinction between Czochralski grown spinel and flame fusion spinel is that of the distinction between Czochralski grown spinel and compound flux grown spinel. The latter distinction comes about through two means: (1) the stoichiometry of the crystal; and, (2) the level of impurities in the crystal. Because of the thermodynamics of the flux reaction, the flux-grown magnesium aluminate spinel is exactly stoichiometric. Thus with the flux-grown material, there is no way to take advantage of the unmodified crystal so as to reap the beneficial effect of alumina richness as an electronic substrate. The second problem encountered with flux-grown spinel is the presence of the flux impurities. Such impurities are generally present throughout the crystal to a degree which interferes significantly with the deposition of electronic materials, especially epitaxial silicon. The presence of this impurity and the inability to obtain the flux-grown spinel in nonstoichiometric form sharply distinguishes the material from that produced in the form of present grown spinel from nonstoichiometric melts.

On this specially prepared surface of the single crystal spinel 1, shown in the figure, a thin film of silicon 2 exhibiting improved properties is epitaxially deposited. The method of epitaxial growth employed is that presented in the G. W. Cullen et al. article cited above (Journal of the Electrochemical Society, October 1969, volume 116, pages 1444 to 1449). By this method, silicon 2 is epitaxially grown on the single crystal spinel surface 1 by pyrolysis of silane ($SiH_4$) in a hydrogen atmosphere at 1100° C. The substrate is heated by direct contact with an inductively heated susceptor which is positioned in a water-cooled quartz ampoule. The gas-metering and gas-mixing apparatus is He leaktight. The gases are mixed before they are passed into the growth chamber. The doping gas is diluted twice in the system so that the flow meters can be used with sufficiently high gas flows to provide good accuracy. Provision has been made in the gas control system to stabilize the flows and metering valve settings before the reactants are exposed to the substrate. The deposition chamber is flushed with $H_2$ while the desired flows are established in the control system. During stabilization, the $SiH_4$-$B_2H_6$-$H_2$ mixture is exhausted through a three-way valve immediately prior to the deposition chamber. This mixture is then suddenly switched into the growth chamber. This method is used because the total deposition time is often as brief as 20 sec., and thus the time needed to set up and to stabilize the system may be a significant portion of the deposition time.

Since the deposition rate is one of the most critical parameters, the thickness of the growing film is continuously monitored by an IR detector (Beckman Instruments Model 924-1230). The hot substrate acts as the IR source, and the interference in the IR intensity is observed as the thickness of the silicon film increases. Unexpected changes in the deposition conditions can be immediately observed with the IR detector.

Upon the deposition of epitaxial silicon, the hole mobility of the layer is measured. This measurement is conducted by detecting the absolute value of the factor $$\frac{E_y}{E_x B_z} = \frac{q\tau}{m^*}$$

The absolute value of this factor $|q|x(\tau/m^*)$ as measured by $|E_y/E_xB_z|$ is called the Hall mobility. Wherein $q$ is the moving charge; $\tau$ is the relaxation time; and $m^*$ is the effective mass; $E_x$ is the electric field applied in the $x$ direction; and $E_y$ is the resultant electric field in the $y$ direction; and $B_z$ is the magnetic field applied in the $z$ direction. For satisfactory interpretation of hole mobility data, it is necessary to know the type and thickness of the epitaxial silicon and the carrier concentration. For the purposes of measuring hole mobility on wafers of Czochralski-grown, alumina-rich spinel, the epitaxial silicon layer is generally $1.5\mu$ thick and p-type with a carrier concentration of approximately $9.6 \times 10^{15}$ cm.$^{-3}$. However, epitaxial p-type silicon of from 0.5 to $2.0\mu$ thick with a carrier concentration of from approximately $10^{15}$ cm.$^{-3}$ to about $10^{17}$ cm.$^{-3}$ have been successfully employed. Additionally, for the purpose of this specification, a "desired predetermined hole mobility" has been selected. From the test results as indicated below and at other places, it has been found desirable to have hole mobilities of $1.5\mu$ thick films on {111} spinel in the range of 100 to 250 cm.$^2$/V-sec. In this range, most of the common devices usually constructed on insulating substrates can readily be built. This range was determined prior to the work on silicon-on-Czochralski spinel by extensive work in silicon epitaxial on flame-fusion spinel as in C. C. Wang et al. October 1968, Technical Report cited above.

The films are then oxidized in dry oxygen for one hour, and the mobility measurement repeated. The mobilities as a function of carrier concentration and oxidation for films deposited at rates between 0.4 and $5.0\mu$/min. are also measured. The as-deposited mobilities of the $1.5\mu$ films are similar to the bulk mobilities.

The as-deposited electrical characteristics of epitaxially grown silicon films deposited on single crystal spinel from alumina-rich melts as hereinbefore mentioned, have a high degree of similarity indicating that the substrate crystal quality is uniform from boule to boule and that the "autodoping" effect for this specific type of crystal is negligible.

We claim:

1. A Czochralski-grown spinel material, that provides a surface which will accept an epitaxial silicon layer thereon, consisting essentially of:

a single crystal of $MgOxAl_2O_3$, having a single phase, wherein the molar ratio $x$ of alumina to magnesia is in the near stoichiometric region of greater than 1.0 to about 1.05, wherein the low angle tilt and twist of the lattice boundaries are both less than 0.5°.

2. A Czochralski-grown spinel material according to claim 1, wherein said single crystal has a dislocation density of less than $10^6$ lines/cm.$^2$.

References Cited

UNITED STATES PATENTS

| | | | |
|---|---|---|---|
| 3,619,131 | 11/1971 | Grabmaier | 23—52 R |
| 3,516,839 | 6/1970 | Bruch | 106—42 |
| 3,083,123 | 3/1963 | Navias | 106—42 |
| 3,447,902 | 6/1969 | Benedict et al. | 23—301 SP |

OTHER REFERENCES

Cullen et al.: Epitaxial Growth . . . (of Si) . . . Alumina—Rich Single Crystal Spinel, in Journ. Electrochem. Soc., 116 (October 1969), pp. 1444–49.

Cockayne et al.: Morphology & Defect Charac. of . . .

$MgAl_2O_4$ Single Crystals; in Journ. Mat. Sci., 4 (1969), pp. 236–41.

Cockyane et al.: Vertical Pulling of $Al_2O_4$ Single Crystals, in Journ. Mat. Sci., 2 (1967), pp. 498–500.

Cockayne et al.: Single-Crystal Growth of Sapphire, in Journ. Mat. Sci. (1967), pp. 7–11.

HELEN M. McCARTHY, Primary Examiner

U.S. Cl. X.R.

23—230, 301, SP; 117—123, 201, 213, 227; 148—1.6, 175; 252—62.3; 423—600